US010605178B2

(12) United States Patent
De Gooijer et al.

(10) Patent No.: US 10,605,178 B2
(45) Date of Patent: Mar. 31, 2020

(54) FOUR-STROKE INTERNAL COMBUSTION ENGINE INCLUDING VARIABLE COMPRESSION RATIO AND A VEHICLE

(71) Applicant: Gomecsys B.V., Naarden (NL)

(72) Inventors: Lambertus Hendrik De Gooijer, Naarden (NL); Sander Wagenaar, Huizen (NL); Willem-Constant Wagenvoort, Huizen (NL)

(73) Assignee: Gomecsys B.V., Naarden (NL)

( * ) Notice: Subject to any disclaimer, the term of this patent is extended or adjusted under 35 U.S.C. 154(b) by 294 days.

(21) Appl. No.: 15/579,746

(22) PCT Filed: Jun. 6, 2016

(86) PCT No.: PCT/EP2016/062767
§ 371 (c)(1),
(2) Date: Dec. 5, 2017

(87) PCT Pub. No.: WO2016/198349
PCT Pub. Date: Dec. 15, 2016

(65) Prior Publication Data
US 2018/0179963 A1   Jun. 28, 2018

(30) Foreign Application Priority Data

Jun. 8, 2015   (EP) .................................... 15170965

(51) Int. Cl.
*F02D 15/00*   (2006.01)
*F02D 15/02*   (2006.01)
(Continued)

(52) U.S. Cl.
CPC .............. *F02D 15/02* (2013.01); *F01L 1/047* (2013.01); *F01L 13/0036* (2013.01);
(Continued)

(58) Field of Classification Search
CPC combination set(s) only.
See application file for complete search history.

(56) References Cited

U.S. PATENT DOCUMENTS 2,090,841 A * 8/1937 Jones ...................... F02B 41/04
74/44
4,044,629 A * 8/1977 Clarke .................... F02B 41/04
74/579 E (Continued)

FOREIGN PATENT DOCUMENTS

EP   1363002 A1   11/2003
EP   1801393 A1   6/2007
(Continued)

OTHER PUBLICATIONS

International Search Report dated Aug. 29, 2016, for corresponding International Application PCT/EP2016/062767, filed Jun. 6, 2016.
(Continued)

*Primary Examiner* — George C Jin
*Assistant Examiner* — Teuta B Holbrook
(74) *Attorney, Agent, or Firm* — Steven M. Koehler; Westman, Champlin & Koehler, P.A.

(57) ABSTRACT

A four-stroke internal combustion engine including variable compression ratio comprises a crankcase including a crankshaft having a crankpin and being supported by the crankcase and rotatable with respect thereto about a crankshaft axis, a connecting rod including a big end and a small end, a crank member being rotatably mounted on the crankpin, and comprising at least a bearing portion which is eccentrically disposed with respect to the crankpin, a crank member drive system for rotating the crank member at a rotation frequency with respect to the crankcase which is half of that of the crankshaft, and a control system for operating the engine with repetitive cycles, wherein the compression ratio in the compression stroke is changed. The control system is
(Continued)

configured to interrupt the repetitive cycles by rotating the crankshaft an additional single revolution between two successive combustion strokes for switching between a high and low compression ratio.

15 Claims, 8 Drawing Sheets

(51) Int. Cl.

| | |
|---|---|
| *F01L 13/00* | (2006.01) |
| *F02B 75/04* | (2006.01) |
| *F01L 1/047* | (2006.01) |
| *F02D 13/02* | (2006.01) |
| *F02B 75/02* | (2006.01) |
| *F02B 75/18* | (2006.01) |
| *F16F 15/26* | (2006.01) |
| *F02B 41/04* | (2006.01) |
| *F16H 59/74* | (2006.01) |
| *F16H 61/02* | (2006.01) |

(52) U.S. Cl.
CPC .......... *F02B 75/02* (2013.01); *F02B 75/048* (2013.01); *F02B 75/18* (2013.01); *F02D 13/0215* (2013.01); *F02D 13/0242* (2013.01); *F16F 15/265* (2013.01); *F01L 2013/0078* (2013.01); *F02B 41/04* (2013.01); *F02B 2075/027* (2013.01); *F02B 2075/1816* (2013.01); *F16H 59/74* (2013.01); *F16H 61/0213* (2013.01); *Y02T 10/18* (2013.01)

(56) References Cited

U.S. PATENT DOCUMENTS

| | | | | |
|---|---|---|---|---|
| 4,924,823 A | * | 5/1990 | Ogura | ............... F02B 75/021 |
| | | | | 123/310 |
| 2003/0213451 A1 | | 11/2003 | Aoyama et al. | |
| 2008/0059031 A1 | | 3/2008 | Yasui et al. | |
| 2011/0036334 A1 | * | 2/2011 | De Gooijer | ............ F02B 41/04 |
| | | | | 123/568.14 |
| 2012/0291755 A1 | * | 11/2012 | Perez | ............... F02B 75/048 |
| | | | | 123/48 B |
| 2014/0360292 A1 | * | 12/2014 | De Gooijer | .......... F16H 37/124 |
| | | | | 74/44 |
| 2016/0061105 A1 | * | 3/2016 | Shen | ............... F02B 75/048 |
| | | | | 123/48 B |

FOREIGN PATENT DOCUMENTS

| | | | |
|---|---|---|---|
| EP | 2025893 A1 | 2/2009 | |
| EP | 2620614 A1 | 7/2013 | |
| WO | 8607115 A1 | 12/1986 | |
| WO | WO-2009018863 A1 * | 2/2009 | ........... F02B 75/048 |
| WO | 2009100759 A1 | 8/2009 | |
| WO | 2013110700 A1 | 8/2013 | |

OTHER PUBLICATIONS

Written Opinion of the International Searching Authority dated Aug. 29, 2016, for corresponding international Application PCT/EP2016/062767, filed Jun. 6, 2016.

* cited by examiner

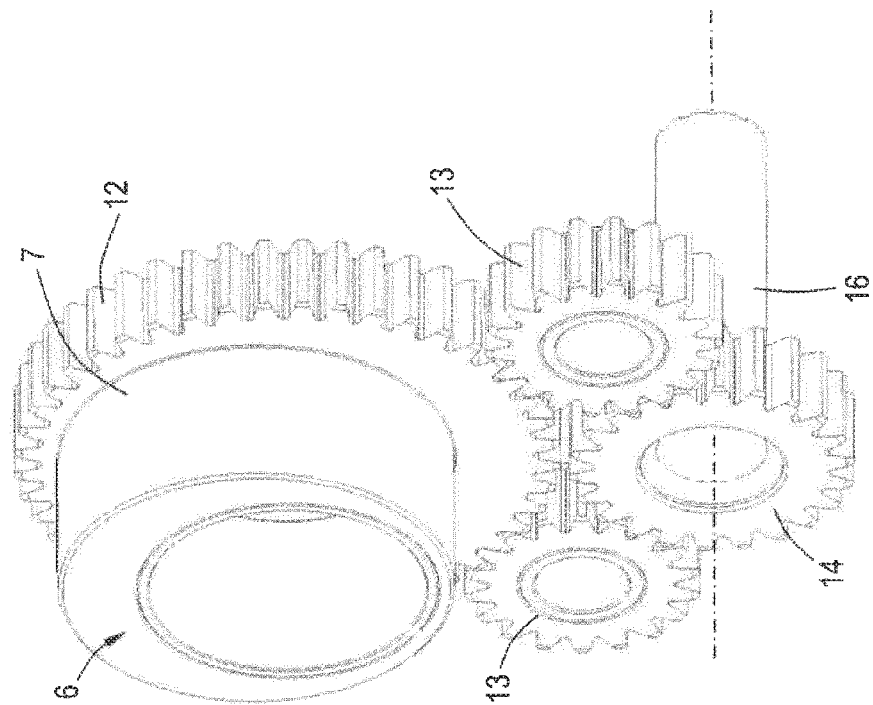
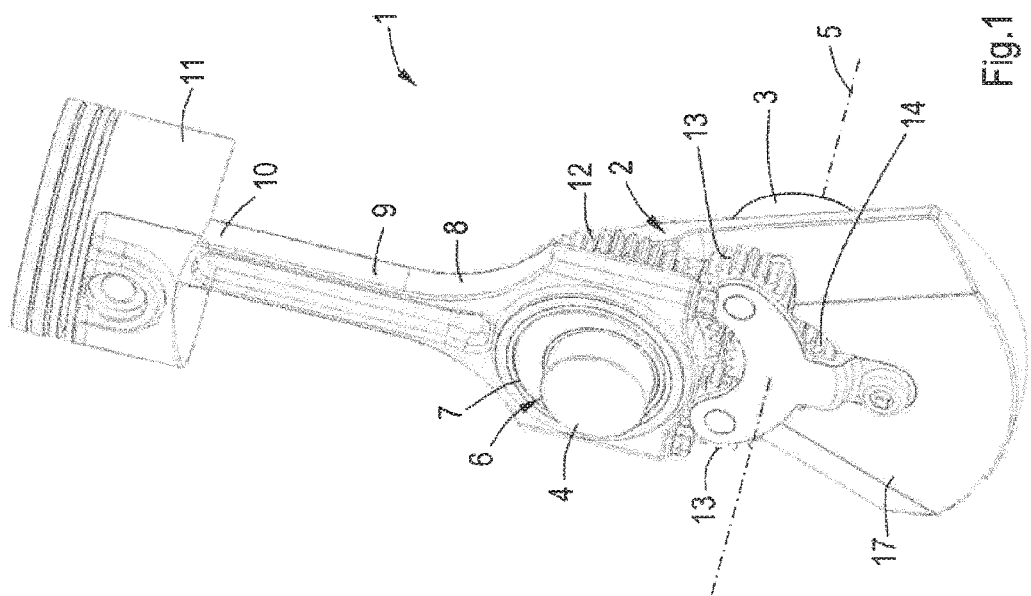

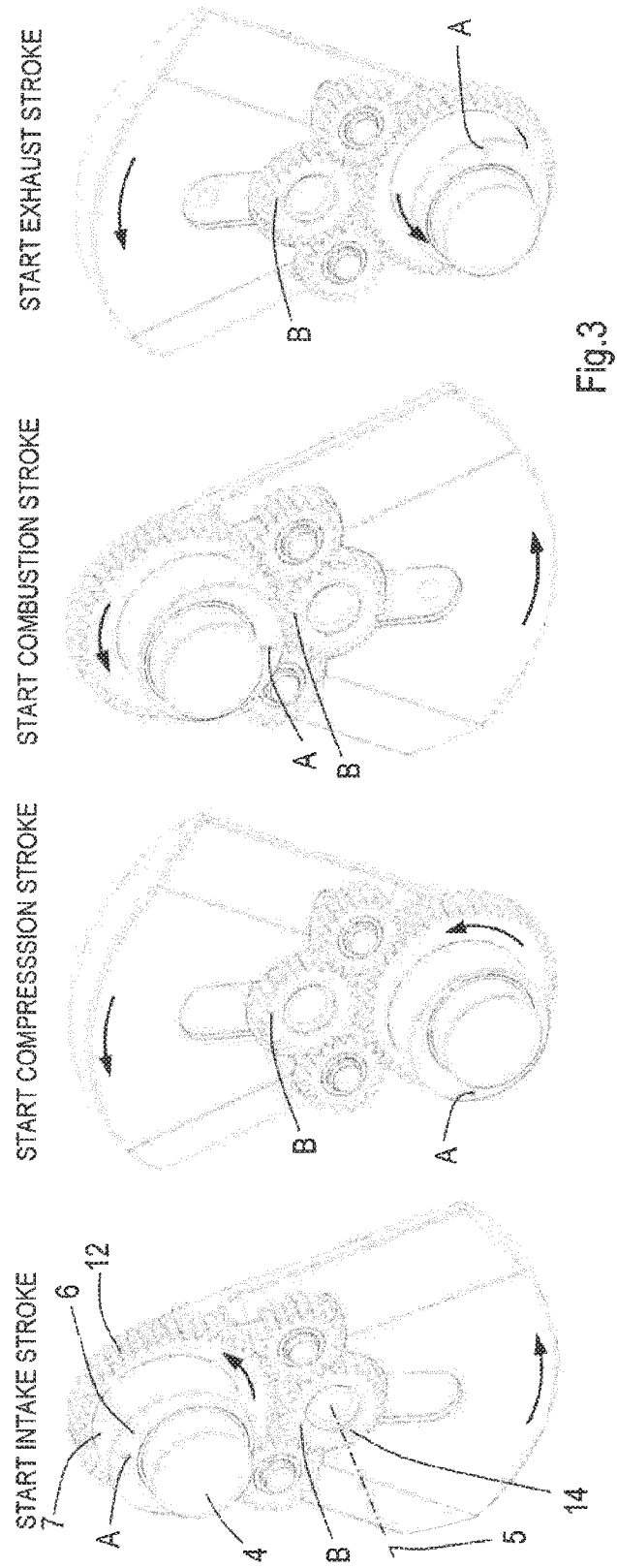

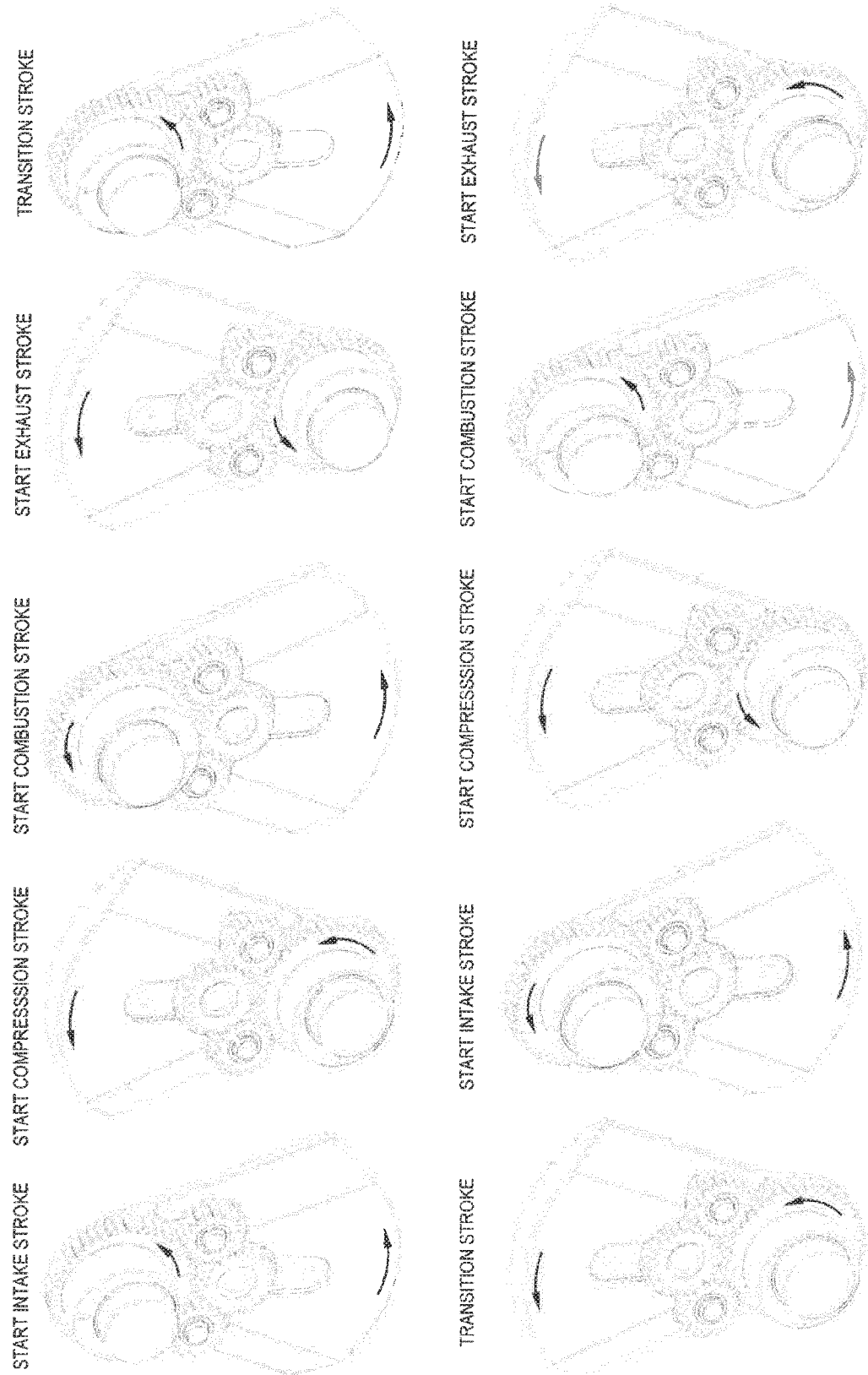

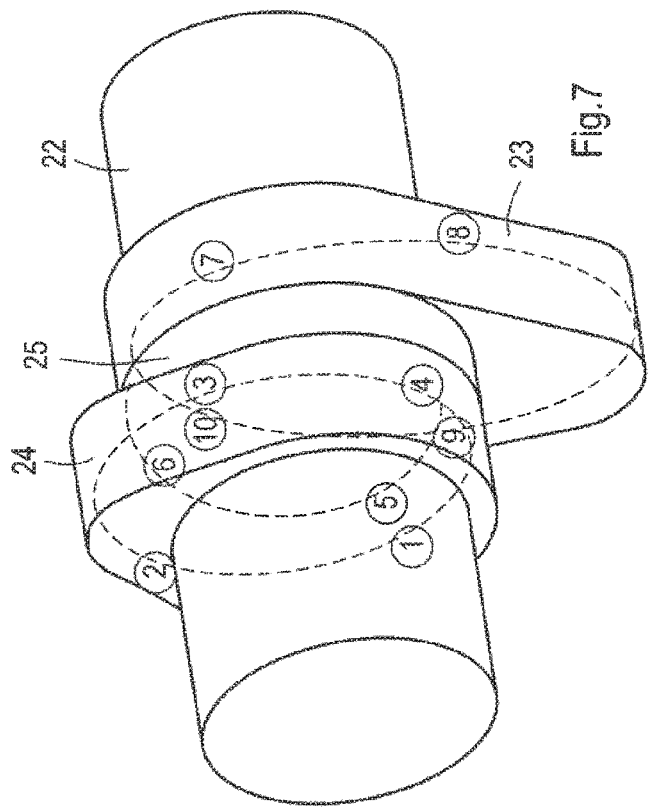
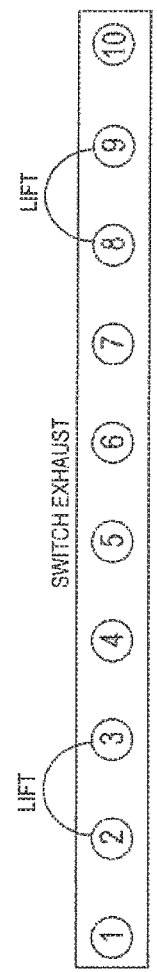

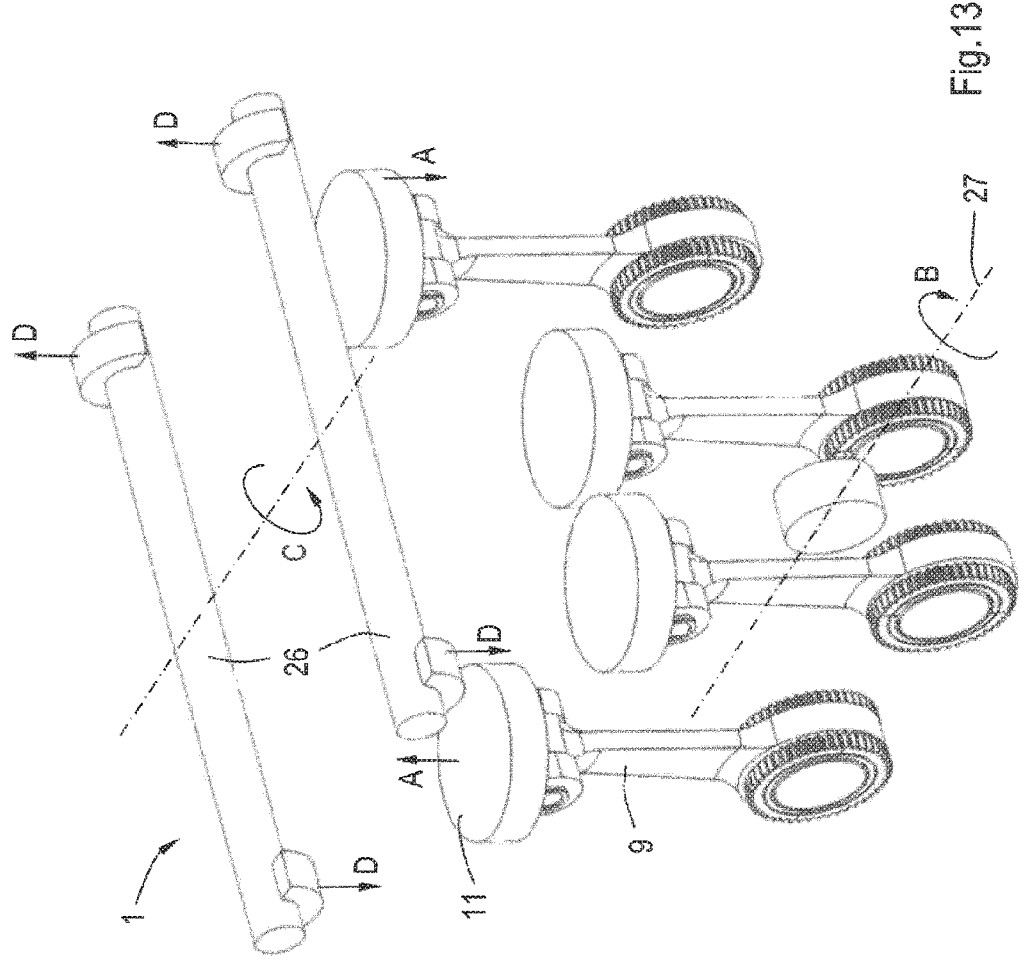

FOUR-STROKE INTERNAL COMBUSTION ENGINE INCLUDING VARIABLE COMPRESSION RATIO AND A VEHICLE

CROSS-REFERENCE TO RELATED APPLICATION

The present application is a national stage filing of International patent application Serial No. PCT/EP2016/062767, filed Jun. 6, 2016, and published as WO 2016/198349 A1 on Dec. 15, 2016.

BACKGROUND

The discussion below is merely provided for general background information and is not intended to be used as an aid in determining the scope of the claimed subject matter.

Aspects of the present invention relates to a four-stroke internal combustion engine including variable compression ratio.

In the field of spark ignition engines an engine with variable compression ratio is well-known. It provides the opportunity to operate the engine at high efficiency, particularly under part-load conditions. Increasing the compression ratio leads to decreasing fuel consumption. When the engine runs at high-load or full-load the compression ratio must be lowered in order to avoid knocking. Several earlier applications of the applicant disclose internal combustion engines with variable compression ratio, for example WO 2013/110700.

SUMMARY

A four-stroke internal combustion engine with a variable compression ratio includes a crankcase including at least a cylinder having an intake valve and an exhaust valve. A crankshaft having a crankpin is supported by the crankcase and rotatable with respect thereto about a crankshaft axis. A connecting rod includes a big end and a small end. A piston is rotatably connected to the small end and slidable in the cylinder. A crank member is rotatably mounted on the crankpin, and comprises at least a bearing portion which is eccentrically disposed with respect to the crankpin, and having an outer circumferential wall which bears the big end of the connecting rod such that the connecting rod is rotatably mounted on the bearing portion of the crank member via the big end. A crank member drive system rotates the crank member at a rotation frequency with respect to the crankcase which is half of that of the crankshaft. A control system operates the engine with repetitive cycles, wherein each cycle includes an intake stroke, compression stroke, combustion stroke and exhaust stroke, respectively, and for changing the compression ratio in the compression stroke. The control system is configured such that it can interrupt the repetitive cycles by rotating the crankshaft an additional single revolution between two successive combustion strokes for switching between a high and low compression ratio.

The strokes of each cycle are defined in a similar way as in conventional four-stroke reciprocating piston engines. The intake stroke involves the downward movement of the piston from top dead center to bottom dead center for drawing air or, for example in case of a spark-ignition engine, an air/fuel mixture through the intake valve into the cylinder. The compression stroke involves the upward movement of the piston from bottom dead center to top dead center for compressing air or an air/fuel mixture in the cylinder. The combustion stroke involves the downward movement of the piston from top dead center to bottom dead center after igniting fuel in the cylinder, in case of a spark-ignition engine after igniting a compressed fuel/air mixture by means of a spark plug. The exhaust stroke involves the upward movement of the piston from bottom dead center to top dead center for removing exhaust gases from the cylinder through the exhaust valve. Similar to conventional spark ignition engines, the control system may already ignite the air/fuel mixture before the piston reaches top dead center, i.e. when the piston is still in its compression stroke. Similarly, the control system may already open the intake valve before top dead center in the exhaust stroke and close it after bottom dead center in the compression stroke, whereas it may already open the exhaust valve before bottom dead center in the combustion stroke and close it after top dead center in the intake stroke. Furthermore, the control system may inject fuel directly into the cylinder and/or upstream of the intake valve. It is noted that the invention is not limited to spark-ignition engines, but applicable to all kinds of four-stroke engines, for example compression ignition engines and HCCI (homogeneous charge compression ignition) engines.

The insertion of the additional single revolution of the crankshaft causes a phase shift of two strokes, which are defined herein as transition strokes. This means that the positions and orientations of the crank member with respect to the crankcase as a function of the rotation angle of the crankshaft during the intake stroke after the phase shift are identical to its positions and orientations during the combustion stroke before the phase shift. Similarly, the positions and orientations of the crank member during the compression stroke after the phase shift are identical to its positions and orientations during the exhaust stroke before the phase shift, and so on. As a consequence, the effective compression ratio, being the compression ratio in the compression stroke, is different after the phase shift. In other words, the phase shift of one crankshaft revolution or two transition strokes provides a switch between low and high compression ratio, which means that the crank member drive system can be relatively simple.

Since the phase shift takes half a cycle the timings of the intake valve, exhaust valve, ignition and fuel injection must be shifted correspondingly by the control system in order to operate the intake, exhaust, combustion and exhaust strokes appropriately. During the transition strokes there is no effective engine operation such as during the intake, compression, combustion and exhaust strokes. It is not necessary that the timings of the intake valve, exhaust valve, ignition and fuel injection is identical at low and high compression ratio. These timings may be varied at different operating conditions of the engine, such as engine load and speed, temperature, etc. In general, the mentioned timings will be shifted by a crankshaft angle of about 360°.

The crank member drive system may have numerous configurations in order to achieve the desired rotation frequency with respect to the rotation frequency of the crankshaft. Several earlier applications of the applicant disclose different types of crank member drive systems, for example WO 2013/110700.

In a practical embodiment, the additional single revolution for creating the phase shift is between the exhaust stroke of a cycle and the intake stroke of a subsequent cycle. This means that the transition strokes are between two subsequent cycles. The control system may close the exhaust valve after top dead center, hence in the first part of the first transition stroke in which the piston moves from top dead center towards bottom dead center, but which is not an intake stroke. Similarly, the control system may open the intake valve already before top dead center, hence before the piston reaches top dead center at the end of the second transition stroke, whereas the second transition stroke is not an exhaust stroke.

The control system may comprise an intake camshaft for operating the intake valve, wherein the intake camshaft has a low compression intake cam and a high compression intake cam located behind each other in longitudinal direction of the intake camshaft, wherein lifts of the respective intake cams are angled with respect to each other about a centerline of the intake camshaft, and wherein the control system is configured such that either the low compression intake cam or the high compression intake cam operates the intake valve by shifting the intake cams along the centerline of the intake camshaft after closing the intake valve so as to change the timing of the intake valve upon switching the compression ratio. The intake cam which actually operates the intake valve may directly or indirectly contact a valve stem of a spring-supported intake valve such that the intake valve exerts a counter force onto that cam. After closing the inlet valve it is relatively easy to shift the intake cams since the intake valve does not longer exert a force on the intake cams.

The lifts may be angled with respect to each other by substantially 180°. It is conceivable that the angle is somewhat larger or smaller in order to vary inlet valve timing between low and high compression ratio.

The intake cams may be shifted by means of shifting the intake camshaft with respect to the crankcase, for example hydraulically controlled.

The control system may comprise an exhaust camshaft for operating the exhaust valve, wherein the exhaust camshaft has a low compression exhaust cam and a high compression exhaust cam located behind each other in longitudinal direction of the exhaust camshaft, wherein lifts of the respective exhaust cams are angled with respect to each other about the centerline of the exhaust camshaft, and wherein the control system is configured such that either the low compression cam or the high compression cam operates the exhaust valve by shifting the exhaust cams along the centerline of the exhaust camshaft after closing the exhaust valve so as to change the timing of the exhaust valve upon switching the compression ratio.

The lifts may be angled with respect to each other by substantially 180°. It is conceivable that the angle is somewhat larger or smaller in order to vary exhaust valve timing between low and high compression ratio.

The exhaust cams are shifted by means of shifting the exhaust camshaft with respect to the crankcase, for example hydraulically controlled.

In a specific embodiment the crankshaft axis and the centerline of the crankpin lie in a common plane and the crank member has a maximum eccentricity which is angled about the centerline of the crankpin with respect to the common plane when the piston is in top dead center at the end of the compression stroke. This means that both at low compression ratio and high compression ratio the maximum eccentricity does not lie in the common plane. If the maximum eccentricity lies in the common plane when the piston is in top dead center at the end of the compression stroke and the centerline of the crankpin lies between the centerline of the bearing portion of the crank member and the crank shaft axis, the maximum possible compression ratio of the engine is selected.

More specifically the crank member drive system may be configured such that the crank member rotates in the same direction as the crankshaft with respect to the crankcase, and wherein when the piston is in top dead center at the end of the compression stroke the angle lies between 0 and 40°, for example 20°, as measured from the common plane in a direction opposite to the rotation direction of the crankshaft. This means that at low compression ratio, when the engine usually runs at high load, the connecting rod and the maximum eccentricity are aligned or close to alignment early in the combustion stroke, which minimizes torque on the crank member under high load conditions. Particularly, when the crank member comprises a gear which meshes with one or more other gears in order to rotate the crank member at the mentioned frequency, this configuration reduces the teeth forces of the gears.

The engine may comprise a balance shaft which is rotatably mounted to the crankcase, which balance shaft is driven in the same direction as the crank member with respect to the crankcase at a rotation frequency with respect to the crankcase which is half of that of the crankshaft. Since the crank member is not rotated with respect to the crankshaft at a virtual standstill of the crankshaft for switching between high and low compression ratio, the position and orientation of the crank member with respect to the crankshaft repeats each two revolutions of the crankshaft. Therefore, the inertia force of the eccentric crank member and a corresponding portion of the big end of the connecting rod rotates at a frequency which is half of the crankshaft speed, as measured with respect to the crankcase. Hence, the repetitive force on the crankcase can be balanced by the balance shaft as defined above. It is also conceivable to apply more than one balance shaft.

In case of a multi-cylinder engine the crank members of all cylinders together cause a rotating torque on the crankshaft about an axis perpendicular to the crankshaft axis. The rotating torque is transferred to the crankcase and can also be balanced by means of the balance shaft or balance shafts. For example, the outer pistons of a four-cylinder engine, i.e. the pistons in cylinders 1 and 4 move synchronously up and down, hence exerting synchronous inertia forces on the crankcase. The directions of the inertia forces change synchronously twice per revolution of the crankshaft, similar to conventional reciprocating piston engines. In a normal firing order of 1-3-4-2, the crank members of cylinder 1 and 4 have a phase shift with respect to each other of a half revolution of the crankshaft, whereas the crank members rotate at half crankshaft speed with respect to the crankcase. This means that when the inertia force at the first cylinder is increased by an additional inertia force caused by the corresponding crank member, the inertia force at the fourth cylinder is lowered by the same additional inertia force caused by the corresponding crank member at the fourth cylinder, resulting in a torque about an axis extending perpendicularly to the crankshaft axis. As described above, the torque rotates about the crankshaft axis at half crankshaft speed. Such a rotating torque also occurs in case of a three-cylinder engine or an engine having five or more cylinders.

In an advantageous embodiment the control system comprises an intake camshaft for operating the intake valve and/or an exhaust camshaft for operating the exhaust valve, wherein the balance shaft is integrated with the intake camshaft and/or the exhaust camshaft. The intake camshaft and the exhaust camshaft also have a speed which is half of the speed of rotation of the camshaft, whereas the mutual rotational positions of the camshafts and the crank member repeat after each two revolutions of the crankshaft and they are not influenced by switching between high and low compression ratio. In practice, a camshaft and balance shaft can be integrated by means of applying counterweights on the camshaft.

The engine may be a multi-cylinder engine, wherein the control system can interrupt the repetitive cycles of the individual cylinders. The order of switching between low compression and high compression ratio in the individual cylinders may be the same as the firing order of the engine, but it may also be different. For example, the engine may be a four-cylinder engine having a firing order of successive cylinders 1-3-4-2, whereas the order of interrupting the repetitive cycles of the individual cylinders is 1-4-2-3. Consequently, there are two ineffective engine strokes during the period of changing the compression ratio, i.e. two half crankshaft revolutions in which no combustion takes place, but the two ineffective strokes are not directly after each other.

The invention is also related to a vehicle comprising an engine as described above, wherein the engine is coupled to an automatic transmission, which is operated such that the gear ratio is changed synchronously with switching between a high and low compression ratio. A phase shift of one revolution for switching between low and high compression ratio introduces an interruption of a half engine cycle during continuous running of the engine in case of one cylinder. In case of a four-cylinder engine, for example, the interruptions of four successive half cycles in the respective cylinders causes a loss of two combustions, which could be felt by the occupants of the vehicle as a short power dip. Since the automatic gear transmission performs a gear change upon switching between low and high compression ratio at the same time it feels quite natural. Switching between compression ratios typically happens upon switching between low engine load and high engine load, hence a change in operating conditions where a gear change is often applied. This means that a small power dip does not happen unexpectedly for the driver. It is noted that for all engine types there is a single non-effective crankshaft revolution upon switching between high and low compression ratio. In case of a 12-cylinder engine, for example, this would mean that six combustions are missed.

BRIEF DESCRIPTION OF THE DRAWINGS

Aspects of the invention will hereafter be elucidated with reference to schematic drawings showing embodiments of the invention by way of example.

FIG. 1 is a perspective view of a part of an embodiment of a four-stroke internal combustion engine including variable compression ratio.

FIG. 2 is a perspective view of a part of the embodiment of FIG. 1 on a larger scale.

FIG. 3 are similar views as FIG. 1, but showing a part thereof during a cycle of intake stroke, compression stroke, combustion stroke and exhaust stroke.

FIG. 4 are similar views as FIG. 3, but illustrating a switch between different compression ratios.

FIGS. 7 and 8 are similar views as FIGS. 5 and 6 respectively, but showing an exhaust camshaft and the operation of the exhaust cams.

FIG. 13 is a perspective view of an alternative embodiment of an engine for illustrating balancing inertia forces.

DESCRIPTION OF THE ILLUSTRATIVE EMBODIMENT

Figure 5:
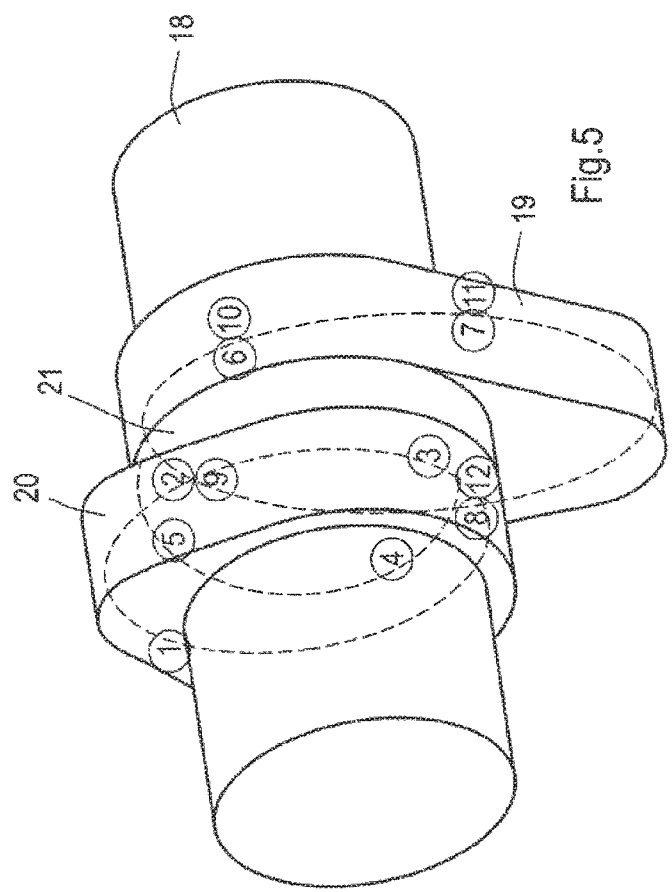
FIG. 5 is a perspective view of an intake camshaft.

FIG. 1 shows a part of an embodiment of a one-cylinder four-stroke internal combustion engine 1 including variable compression ratio. The engine 1 comprises a crankcase (not shown), which supports a crankshaft 2 at a bearing portion 3 thereof. The crankshaft 2 includes a crankpin 4 and is rotatable with respect to the crankcase about a crankshaft axis 5.

The engine 1 comprises a crank member 6 which is rotatably mounted on the crankpin 4. The crank member 6 is provided with a bearing portion 7 which is disposed eccentrically with respect to the crankpin 4, see FIG. 2. The bearing portion 7 has an outer circumferential wall which bears a big end 8 of a connecting rod 9. Thus, the connecting rod 9 is rotatably mounted on the crank member 6 via its big end 8. The connecting rod 9 also includes a small end 10 to which a piston 11 is rotatably connected. Under operating conditions of the engine 1 the piston 11 slides reciprocatingly in a cylinder (not shown) of the crankcase. The cylinder is provided with an intake valve and an exhaust valve (not shown). Furthermore, the engine 1 has an ignition system (not shown) for starting combustion and a fuel injection system (not shown).

In the embodiment as shown in FIGS. 1 and 2 the crank member 6 is provided with a crank member gear 12 which meshes with two intermediate gears 13. The intermediate gears 13 are rotatably mounted to the crankshaft 2 and their axes of rotation extend parallel to the crankshaft axis 5. Each of the intermediate gears 13 also meshes with an auxiliary gear 14. The auxiliary gear 14 is fixed to an auxiliary shaft 16. The auxiliary shaft 16 extends concentrically through the crankshaft 2 and is rotatable with respect to the crankshaft 2 about the crankshaft axis 5. Thus, the auxiliary shaft 16 is rotatable about an auxiliary shaft axis which substantially coincides with the crankshaft axis 5. As a consequence, the center line of the auxiliary gear 14 coincides with the crankshaft axis 5.

In this case the auxiliary gear 14, the intermediate gears 13 and the crank member gear 12 are mounted at the same side of a crank arm 17 of the crankshaft 2. The crank arm 17 and the adjacent bearing portion 3 of the crankshaft 2 are integrated such that the auxiliary shaft 16 extends through both.

In the embodiment as shown in FIGS. 1 and 2 the crank member gear 12, the intermediate gears 13 and the auxiliary gear 14 are external gears. The gear dimensions are selected such that under operating conditions the crank member 6 rotates in the same direction as the crankshaft 2 and at half speed thereof, as seen with respect to the crankcase. The directions and speeds of rotation are achieved when the gear ratio between the crank member gear 12 and the auxiliary gear 14 is two and the auxiliary shaft 16 is hold at a constant angular position with respect to the crankcase. In the embodiment of the engine 1 as shown the auxiliary shaft 16 is attached to the crankcase.

FIG. 3 illustrates the functioning of the engine 1 under stationary operating conditions by means of four different positions of the crankshaft 2 with respect to the crankcase. For illustrative reasons the crank member 6 and the auxiliary gear 14 are provided with marks A, B. Mark A is applied at the angular position of the crank member 6 where the bearing portion 7 has its maximum eccentricity. The direction of rotation of the crankshaft 2 and the crank member 6 with respect to the crankcase are shown by respective arrows. From left to right the drawings of FIG. 3 show the start of the intake stroke where the piston 11 is at top dead center, the start of the compression stroke where the piston 11 is at bottom dead center, the start of the combustion stroke where the piston 11 is at top dead center, and the start of the exhaust stroke where the piston 11 is at bottom dead center, respectively. Under stationary operating conditions the illustrated cycle is repeated continuously.

Since the auxiliary shaft 16 is attached to the crankcase, mark B remains at the same angular position whereas the crank member gear 12 rotates anti-clockwise with respect to the crankcase, as seen in FIG. 3, i.e. as seen in a direction from a rear side to a front side of the engine 1. FIG. 3 illustrates that two revolutions of the crankshaft 2 corresponds to one revolution of the crank member 6, as defined with respect to the crankcase.

In the configuration as shown in FIG. 3 it can be seen that at the start of the combustion stroke, i.e. when the piston 11 is in top dead center, the maximum eccentricity of the crank member 6 is directed downwardly. This means that the effective compression ratio in the compression stroke is low. This is a desired condition in case of operating the engine at high load in order to avoid knocking.

When the engine runs at low load a high compression ratio is desired. This results in improved efficiency whereas the risk of knocking is much lower than at high engine load. Since the auxiliary shaft 16 of the engine 1 as shown in FIGS. 1 and 2 is not rotatable with respect to the crankcase, there are two possible different compression ratios: the maximum eccentricity of the crank member 6 is directed downwardly at the start of the combustion cycle, as shown in FIG. 3, or it is directed upwardly at the start of the combustion cycle. In the latter case the timings of the intake stroke, compression stroke, combustion stroke and exhaust stroke must be changed with respect to the angular position of the crankshaft 2. For this reason the engine has a control system which interrupts the repetitive cycles by rotating the crankshaft an additional single revolution between two successive combustion strokes for changing the compression ratio. This is illustrated in FIG. 4 for the embodiment as shown in FIGS. 1 and 2.

The first four drawings in the upper row from left to right in FIG. 4 are similar to the drawings in FIG. 3. The last drawing of the upper row and the first drawing of the lower row represent transition strokes. During the transition strokes the crankshaft 2 rotates one revolution before a new cycle of intake stroke, compression stroke, combustion stroke and exhaust stroke occurs. An effect of interrupting the repetitive cycles by the two transition strokes is that at the start of the next combustion stroke, i.e. when the piston is at top dead center, the maximum eccentricity of the crank member 6 is directed upwardly. Consequently, the effective compression ratio in the compression stroke has become high. In the same way, by interrupting the repetitive cycles by one revolution, the engine 1 may be switched back from high compression ratio to low compression ratio.

In the embodiment of FIG. 3 the centerline of the bearing portion 7 of the crank member 6 lies in a common plane with the crankshaft axis 5 and the centerline of the crankpin 4, and the centerline of the bearing portion 7 lies between the crankshaft axis 5 and the centerline of the crankpin 4 at the end of the compression stroke, see the third drawing from the left. This means that the lowest possible compression ratio of the engine 1 is selected. After switching to high compression ratio the centerline of the bearing portion 7 lies again in the common plane with the centerline of the crankpin 4 and the crankshaft axis 5 at the end of the compression stroke, but now the centerline of the crankpin 4 lies between the centerline of the bearing portion 7 and the crankshaft axis 5. In an alternative embodiment a plane through the centerline of the bearing portion 7 and the centerline of the crankpin 4 may be angled with respect to the common plane in which the centerline of the crankpin 4 and the crankshaft axis 5 lie at the end of the compression stroke at high compression ratio or low compression ratio.

The addition of one revolution in the repetitive cycles causes a shift of one revolution in the intake stroke, compression stroke, combustion stroke and exhaust stroke, which means that timing of the intake valve, exhaust valve, ignition and fuel injection must be shifted. Modern ignition and fuel injection systems are electronically controlled and very flexible in respect of adapting ignition and fuel injection timing.

The embodiment of the engine 1 as shown in FIGS. 1 and 2 is provided with an intake camshaft 18 which has a low compression intake cam 19 and a high compression intake cam 20, see FIG. 5. The low compression intake cam 19 and the high compression intake cam 20 are located behind each other in longitudinal direction of the intake camshaft 18. A circular ring 21 is located between the intake cams 19, 20. The control system can shift the intake camshaft 18 along its centerline such that either the low compression intake cam 19 or the high compression intake cam 20 operates the intake valve. The intake cams, 19, 20 have respective lifts which are angled with respect to each other about the centerline of the intake camshaft 18, in this case about 180°. The low compression intake cam 19 has a higher lift than the high compression intake cam 20 in this case, but that may be different in an alternative embodiment.

Figure 6:
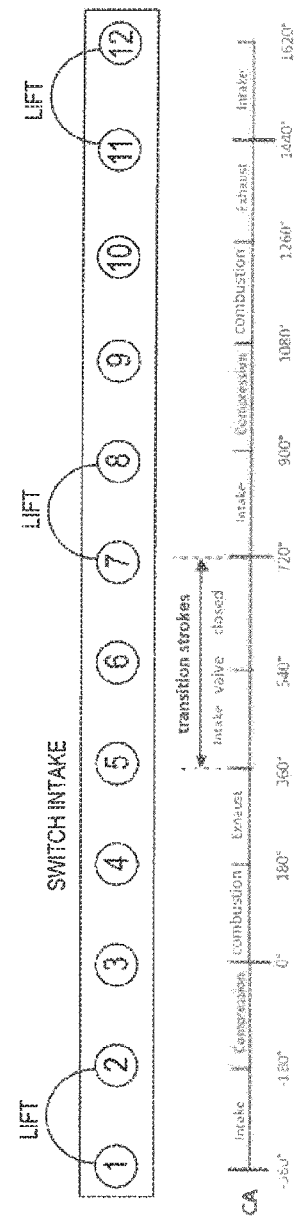
FIG. 6 is a diagram for illustrating the operation of the intake cams.

Upon switching between compression ratios the control system displaces the intake camshaft 18 along its centerline after closing the intake valve. This is illustrated in FIGS. 5 and 6 by means of numbers 1-12 along a path on the outer surface of the intake cams 19 and 20 and the circular ring 21, which path is followed by a contact surface of the intake valve, for example its valve stem. The numbers 1-12 in FIG. 6 correspond with the numbers 1-12 in FIG. 5. FIG. 6 shows the crankshaft angle in horizontal direction. Number 1 represents the start of the intake stroke in top dead center, number 2 represents the start of the compression stroke in bottom dead center, and so on. The numbers 1-2 indicate the period of opening the intake valve in the intake stroke. It is noted that the intake stroke is defined as the displacement of the piston 11 from top dead center to bottom dead center, but the intake valve may be opened before top dead center and closed after bottom dead center, for example. During the compression stroke from 2 to 3 the high compression intake cam 20 has a circular outer portion and the intake valve remains closed. In the combustion stroke the camshaft 18 is displaced along its centerline such that the contact surface of the intake valve follows the indicated path in FIG. 5 from number 3 via 4 and 5 to 6. The radius of the ring 21 is the same as the radius of the circular portions of the low and high compression intake cams 19, 20 such that the intake valve remains closed during the period from number 3 to 6. In the meantime the piston reached the period of transition strokes as indicated in FIG. 6. Without shifting the intake camshaft 18 the transition strokes would be an intake stroke and a compression stroke, respectively. Subsequently, the low compression intake cam 19 will open the intake valve upon reaching number 7 of the path as indicated in FIG. 5. The intake valve will now be operated by the low compression intake cam 19 until the engine 1 must be switched to operation at high compression ratio.

The embodiment of the engine as shown in FIGS. 1 and 2 is also provided with an exhaust camshaft 22 which has a low compression exhaust cam 23 and a high compression exhaust cam 24, see FIG. 7. The low compression exhaust cam 23 and the high compression exhaust cam 24 are located behind each other in longitudinal direction of the exhaust camshaft 22. A circular ring 25 is located between the exhaust cams 23, 24. The control system can shift the exhaust camshaft 22 along its centerline such that either the low compression exhaust cam 23 or the high compression exhaust cam 24 operates the exhaust valve. The exhaust cams 23, 24 have respective lifts which are angled with respect to each other about the centerline of the exhaust camshaft 22, in this case about 180°. The low compression exhaust cam 23 has a higher lift than the high compression exhaust cam 24 in this case, but that may be different in an alternative embodiment.

Upon switching between compression ratios the control system displaces the exhaust camshaft 22 along its centerline after closing the exhaust valve. This is illustrated in FIGS. 7 and 8 by means of numbers 1-10 along a path on the outer surface of the exhaust cams 23 and 24 and the circular ring 25 which path is followed by a contact surface of the exhaust valve. FIG. 8 shows the crankshaft angle in horizontal direction. Number 1 represents the start of the combustion stroke in top dead center, number 2 represents the start of the exhaust stroke at bottom dead center, and so on. The numbers 1-10 in FIG. 8 correspond with the numbers 1-10 in FIG. 7. The numbers 2-3 indicate the period of opening the exhaust valve in the exhaust stroke. It is noted that the exhaust stroke is defined as the displacement of the piston 11 from bottom dead center to top dead center, but the exhaust valve may be opened before bottom dead center and closed after top dead center, for example. During the transition strokes the control system starts to displace the exhaust camshaft 22 along its centerline such that the contact surface of the exhaust valve follows the indicated path in FIG. 7 from number 4 via 5 and 6 to 7. The radius of the ring 25 is the same as the radius of the circular portions of the low and high compression cams 23, 24 such that the exhaust valve remains closed during the period from number 4 to 7. Subsequently, the low compression exhaust cam 23 will open the exhaust valve upon reaching number 8 of the path as indicated in FIG. 7. The exhaust valve will now be operated by the low compression exhaust cam 23 until the engine 1 must be switched to operation at high compression ratio.

In case of a multi-cylinder engine the respective intake valves as well as the exhaust valves are operated individually. An effect of interrupting the repetitive cycles by rotating the crankshaft 2 an additional single revolution between two successive combustion strokes of each cylinder means that in case of an inline four-cylinder engine having a firing order 1-3-4-2, for example, two combustions are omitted. This is demonstrated in FIG. 9, which shows the crank angle of the crankshaft 2 in horizontal direction and the cylinder numbers 1, 3, 4 and 2. At a crank angle of 0° the combustion stroke of cylinder 1 starts and at a crank angle of 180° the combustion stroke of cylinder 3 starts, and so on. The additional revolution, comprising two transition strokes, takes place from 720 to 1080°. For cylinder 2 the intake valve cams are switched after 360° such that the other intake valve cam opens the intake valve 1.5 cycle, or six strokes, later. Hence, the next intake stroke does not start at 900°, but at 1260°. The exhaust valve cams are switched after 900° when the exhaust stroke of cylinder 2 has been finalized. The next combustion stroke of cylinder 2 does not start at 1260°, as indicated by a broken circular line in FIG. 9, but at 1620°. The intake stroke of cylinder 2 now starts at 1260° instead of the combustion stroke. This process is illustrated in the table of FIG. 10 for all four cylinders, in which the rows represent the four respective cylinders, whereas the abbreviations 'comb' stands for combustion stroke, 'exh' stands for exhaust stroke, 'int' stands for intake stroke and 'compr' stands for compression stroke, respectively.

Figure 10:
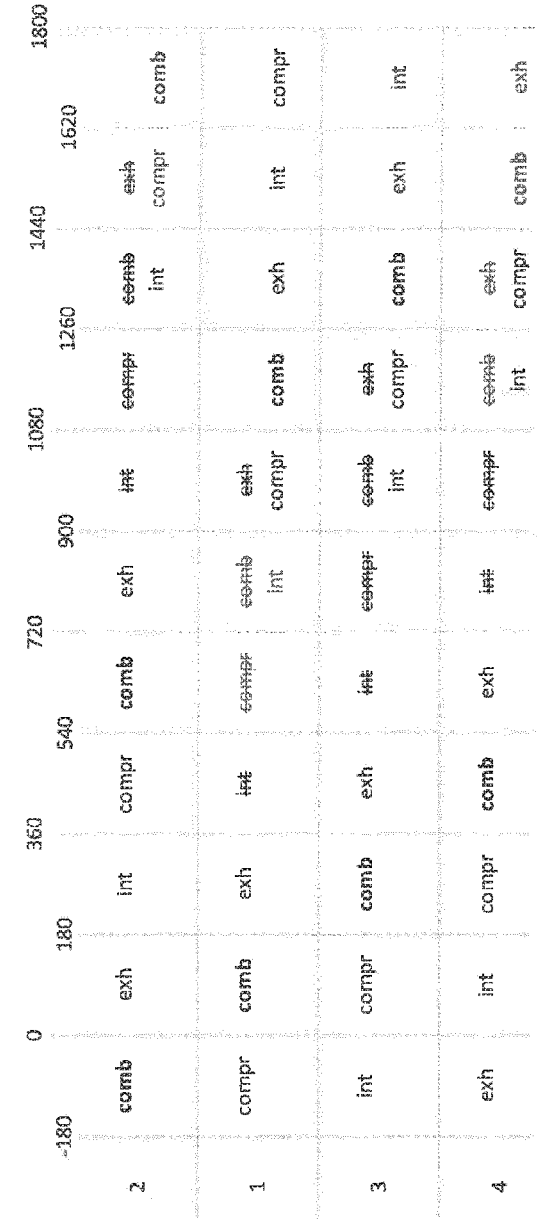

It can be seen in FIG. 10 that during each revolution of the crankshaft the engine has two combustion strokes, except during the transition strokes. In FIG. 10 the period where no combustion strokes occur is indicated as transition strokes, but in fact these are the transition strokes of cylinder 4. Basically, each cylinder has two transition strokes which are mutually shifted for the respective cylinders. The transition strokes where no effective engine stroke happens for cylinder 2 is between 900° and 1260°, for cylinder 1 between 360° and 720°, and so on.

The timing of switching the intake cams and the exhaust cams is different for each of the cylinders. Switching of the intake cams and exhaust cams in cylinder 1 already starts before the transition strokes, whereas in cylinder 2 switching of the exhaust cam must not start before the transition strokes as indicated in FIG. 10 since the first transition stroke coincides with the exhaust stroke of cylinder 2.

FIG. 10 makes clear that the series of combustion strokes is interrupted between 720 and 1080°. If the engine is applied as a vehicle engine the occupant(s) may feel a small dip in power output during switching between low and high compression ratio since one crankshaft revolution is used for switching instead of two combustion strokes. In practice, however, switching between compression ratios typically happens upon switching between low engine load and high engine load, i.e. a change in operating conditions where a gear change is often applied. Therefore, when the engine is applied in a vehicle it is advantageous to couple it to an automatic transmission, which is operated such that the gear ratio is changed synchronously with switching between a high and low compression ratio. The resulting effect is comparable to a kick-down effect in case of a conventional automatic transmission which typically occurs when the driver attempts to accelerate from a constant speed.

Figure 9:
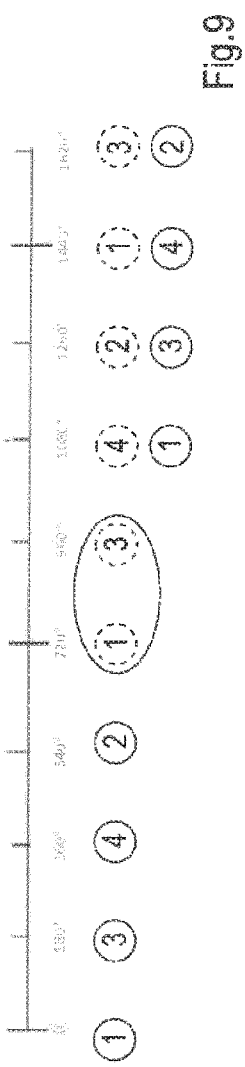
FIGS. 9 and 10 are diagrams for illustrating the operation of another embodiment of an engine.
Figure 11:
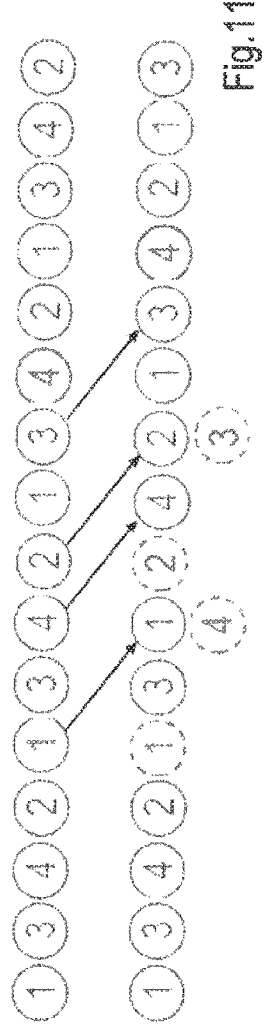
FIGS. 11 and 12 are similar diagrams as FIGS. 9 and 10, but illustrating an alternative manner of switching between compression ratios.
Figure 12:
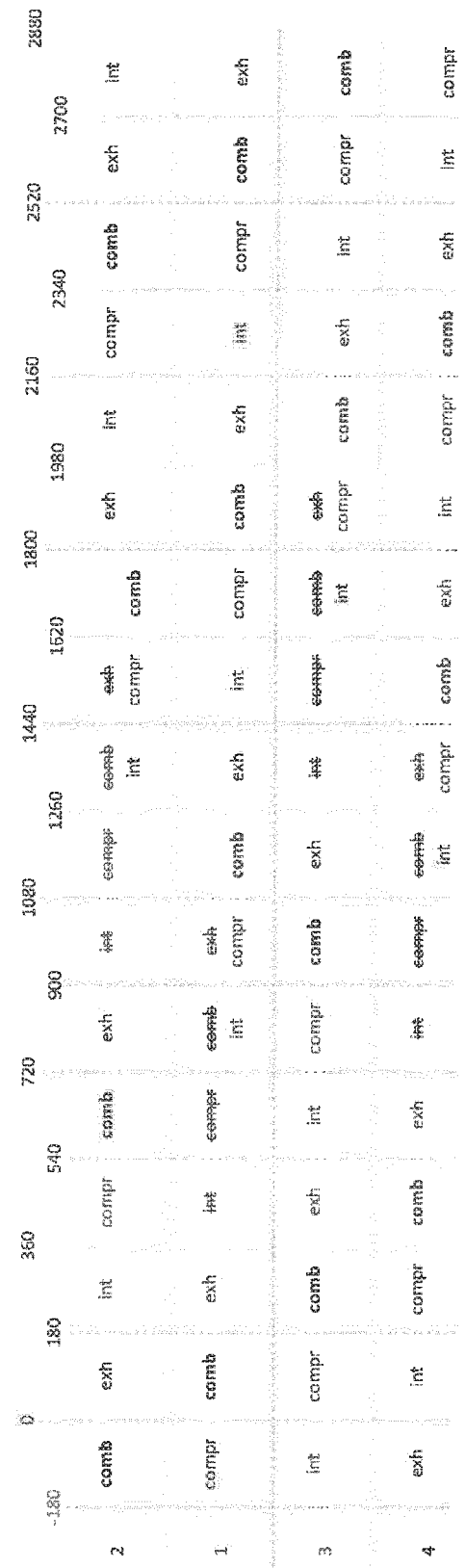

In case of a multi-cylinder engine the sequence of switching can be varied. For example the sequence of switching in case of the four-cylinder engine as demonstrated in FIGS. 9 and 10 is 1->3->4->2, similar to its firing order. FIGS. 11 and 12 illustrate an alternative sequence of switching: 1->4->2->3. The transition strokes of cylinder 1 start at 360°, of cylinder 4 at 720°, of cylinder 2 at 900° and of cylinder 3 at 1260°. FIG. 11 shows by broken circular lines which cylinder is ineffective at a certain moment. For example, upon switching cylinder 1, this cylinder is ineffective during one crankshaft revolution and indicated by a broken circular line around number 1; cylinder 1 has a combustion stroke where cylinder 4 would have a combustion stroke (broken circular line around number 4) if there was no change of compression ratio. Similarly, after switching cylinder 2, cylinder 2 has a combustion stroke where cylinder 3 would have a combustion stroke if there was no change of compression ratio. As a consequence, the ineffective strokes during which no combustion takes place, are between 720 and 900° and between 1260 and 1440°, see FIG. 12. This means that it is not a single complete crankshaft revolution during which no combustion takes place upon changing compression ratio, but two half revolutions which do not immediately follow each other.

An advantage of the method of switching between low compression ratio and high compression ratio as described hereinbefore is that a simple crank member drive system can be applied. In the crank member drive system as described above the orientation and position of the crank member 6 with respect to the crankcase repeats after each two revolutions of the crankshaft 2 since the crank member 6 is not rotated with respect to the crankshaft 2 at a virtual standstill thereof for adapting the compression ratio such as in known systems. This means that the inertia force of the eccentrical crank member 6 is repetitive and well-defined. In a four-cylinder engine as described hereinbefore the inertia forces of the respective crank members cause a torque about an axis extending transversely with respect to the crankshaft axis which rotates at half speed of the crankshaft, independent from operating the engine at low or high compression ratio. This provides the opportunity to balance the rotating torque by means of counterweights on the intake camshaft 18 and/or the exhaust camshaft.

FIG. 13 shows parts of an alternative embodiment of an engine 1, which is a four-cylinder in-line engine. The engine 1 is provided with two balance shafts 26 which are rotatably mounted to the crankcase. The balance shafts 26 have rotation axes that extend parallel to the crankshaft axis 5. The balance shafts 26 are driven in the same direction as the direction of rotation of the crank member 6 with respect to the crankcase. Their rotation frequencies with respect to the crankcase are half of the rotation frequency of the crankshaft 2. FIG. 13 does not show a control system for operating inlet and exhaust valves, but it may be clear that the balance shafts may be integrated with the camshafts for operating the inlet and exhaust valves. It is also possible that the balance shafts 26 are replaced by a single balance shaft.

Arrows A in FIG. 13 illustrate inertia forces of the crank members 6 at the outer cylinders of the engine 1. Their directions are opposite to each other since the centerlines of the respective bearing portions 7 are at opposite sides of the centerlines of the respective crankpins 4. Since the pistons of the outer cylinders are in top dead center in the situation as shown in FIG. 13, the total inertia forces at both cylinders (due to the reciprocating weights) will be directed in the same direction, but one of them is increased by the inertia force A of the corresponding crank member 6 and the other one is lowered by the inertia force A of the corresponding crank member 6. As shown in FIG. 13 the opposite inertia forces A due to the rotating crank members 6 cause a torque B about a torque axis 27 extending perpendicularly to the crankshaft axis 5. The torque B is exerted on the crankcase and compensated by torque C which is generated by forces D due to the counterweights on the balance shafts 26. A rotating torque is also created at the two cylinders between the outer cylinders (not indicated in FIG. 13), but this torque is much lower than the one created at the outer cylinders. The lower torque may be neglected or balanced in a similar way as the higher torque.

There is a difference between balancing the inertia forces caused by the crank members of a multi-cylinder engine and balancing the inertia force of the crank member of a single-cylinder engine. In case of a single-cylinder engine the crank member does not create a rotating torque, but a rotating force onto the crankcase. This can be compensated by a balance shaft, but this introduces a torque on the crankcase about an axis extending parallel to the crankshaft axis. However, a rotating torque in case of a multi-cylinder engine, can fully or nearly fully be compensated by a balance shaft.

It is noted that a balance shaft for balancing inertia forces of the crank member is also possible in case of a different system for varying compression ratio. In general, the following engine is conceivable:

An internal combustion engine including variable compression ratio, comprising a crankcase, a crankshaft having a crankpin and being supported by the crankcase and rotatable with respect thereto about a crankshaft axis, at least a connecting rod including a big end and a small end, a piston being rotatably connected to the small end, a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end, a crank member drive system for rotating the crank member at a rotation frequency with respect to the crankcase which is half of that of the crankshaft, a crank member control system for varying the rotational position of the crank member at virtual standstill of the crankshaft under operating conditions in order to vary the compression ratio, a balance shaft which is rotatably mounted to the crankcase, which balance shaft is driven in the same direction as the crank member with respect to the crankcase at a rotation frequency with respect to the crankcase which is half of that of the crankshaft, a balance shaft phase shifter for varying the rotational position of the balance shaft at virtual standstill of the crankshaft under operating conditions synchronously with the crank member and in the same direction as the crank member upon changing the rotational position of the crank member at virtual standstill of the crankshaft.

It is also possible that the balancing shaft is integrated with an intake and/or exhaust camshaft, but in that case the cam timing is also varied with varying the rotational position of the crank member at a virtual standstill of the crankshaft.

Furthermore, the balance shaft or balance shafts may be applied for balancing a rotating torque on the crankshaft about an axis perpendicular to the crankshaft axis in case of a multi-cylinder engine.

An example of a crank member control system for varying the rotational position of the crank member at virtual standstill of the crankshaft under operating conditions can be found in EP 2 620 614.

From the foregoing, it will be clear that the invention provides a four-stroke internal combustion engine with variable compression ratio which has a simple manner of switching between low and high compression ratio.

The invention is not limited to the embodiments shown in the drawings and described hereinbefore, which may be varied in different manners within the scope of the claims and their technical equivalents. For example, it is conceivable that the intake valve and/or the exhaust valve is/are electronically controlled instead of mechanically through camshafts. A control system for electronically control of intake and/or exhaust valve provide great flexibility. Furthermore, it is not necessary that the maximum eccentricity of the crank member at high compression ratio and low compression ratio is directed upwardly and downwardly, respectively, in vertical direction in top dead center at the end of the compression stroke. Although the respective directions of the maximum eccentricity are always opposite to each other, they may be angled with respect to the vertical when the piston is in top dead center at the end of the compression stroke.

The invention claimed is:

1. A four-stroke internal combustion engine including variable compression ratio, comprising
a crankcase including at least a cylinder having an intake valve and an exhaust valve,
a crankshaft having a crankpin and being supported by the crankcase and rotatable with respect thereto about a crankshaft axis,
a connecting rod including a big end and a small end,
a piston being rotatably connected to the small end and slidable in the cylinder,
a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end,
a crank member drive system configured to rotate the crank member at a rotation frequency with respect to the crankcase which is half of that of the crankshaft,
a control system configured to operate the engine with repetitive cycles, wherein each cycle includes an intake stroke, compression stroke, combustion stroke and exhaust stroke, respectively, and to change the compression ratio in the compression stroke,
wherein the control system is configured such that it can interrupt the repetitive cycles by rotating the crankshaft an additional single revolution between two successive combustion strokes for switching between a high and low compression ratio.

2. The engine according to claim 1, wherein the additional single revolution is between the exhaust stroke of a cycle and the intake stroke of a subsequent cycle.

3. The engine according to claim 1, wherein the control system comprises an intake camshaft configured to operate the intake valve, wherein the intake camshaft has a low compression intake cam and a high compression intake cam located behind each other in longitudinal direction of the intake camshaft, wherein lifts of the respective intake cams are angled with respect to each other about a centerline of the intake camshaft, and wherein the control system is configured such that either the low compression intake cam or the high compression intake cam operates the intake valve by shifting the intake cams along the centerline of the intake camshaft after closing the intake valve so as to change the timing of the intake valve upon switching the compression ratio.

4. The engine according to claim 3, wherein said lifts are angled with respect to each other by substantially 180°.

5. The engine according to claim 3, wherein the intake cams are shifted by shifting the intake camshaft with respect to the crankcase.

6. The engine according to claim 1, wherein the control system comprises an exhaust camshaft configured to operate the exhaust valve, wherein the exhaust camshaft has a low compression exhaust cam and a high compression exhaust cam located behind each other in longitudinal direction of the exhaust camshaft, wherein lifts of the respective exhaust cams are angled with respect to each other about the centerline of the exhaust camshaft, and wherein the control system is configured such that either the low compression exhaust cam or the high compression exhaust cam operates the intake valve by shifting the exhaust cams along the centerline of the exhaust camshaft after closing the exhaust valve so as to change the timing of the exhaust valve upon switching the compression ratio.

7. The engine according to claim 6, wherein said lifts are angled with respect to each other by substantially 180°.

8. The engine according to claim 6, wherein the exhaust cams are shifted by shifting the exhaust camshaft with respect to the crankcase.

9. The engine according to claim 1, wherein the crankshaft axis and the centerline of the crankpin lie in a common plane, wherein the crank member has a maximum eccentricity which is angled about the centerline of the crankpin with respect to said common plane when the piston is in top dead center at the end of the compression stroke.

10. The engine according to claim 9, wherein the crank member drive system is configured such that the crank member rotates in the same direction as the crankshaft with respect to the crankcase, and wherein when the piston is in top dead center at the end of the compression stroke the angle lies between 0 and 40°, as measured from said common plane in a direction opposite to the rotation direction of the crank member.

11. The engine according to claim 1, wherein a balance shaft is rotatably mounted to the crankcase, which balance shaft is driven in the same direction as the crank member with respect to the crankcase at a rotation frequency with respect to the crankcase which is half of that of the crankshaft.

12. The engine according to claim 11, wherein the control system comprises an intake camshaft configured to operate the intake valve and/or an exhaust camshaft configured to operate the exhaust valve, wherein the balance shaft is integrated with the intake camshaft and/or the exhaust camshaft.

13. The engine according to claim 1, wherein the engine is a multi-cylinder engine having a predetermined firing order of successive cylinders, and wherein the order of interrupting the repetitive cycles of the individual cylinders is different from the firing order.

14. The engine according to claim 13, wherein the engine is a four-cylinder engine having a firing order of successive cylinders 1-3-4-2, and wherein the order of interrupting the repetitive cycles of the individual cylinders is 1-4-2-3.

15. The vehicle comprising an engine according to claim 1, wherein the engine is coupled to an automatic transmission, which is operated such that the gear ratio is changed synchronously with switching between a high and low compression ratio.

* * * * *